(12) United States Patent
Neal, III et al.

(10) Patent No.: US 9,703,295 B1
(45) Date of Patent: *Jul. 11, 2017

(54) SYSTEMS, DEVICES, AND/OR METHODS FOR MANAGING TARGETED PAYLOAD DESCENT

(71) Applicant: Barron Associates, Inc., Charlottesville, VA (US)

(72) Inventors: David Anthony Neal, III, Charlottesville, VA (US); Kevin Marlan Ehlmann, Charlottesville, VA (US); William Thomas Gressick, Greenwood, VA (US); Alec Jacob Devine Bateman, Charlottesville, VA (US); Kenneth Richard Horneman, Waxhaw, NC (US)

(73) Assignee: Barron Associates, Inc., Charlottesville, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/596,471

(22) Filed: Jan. 14, 2015

Related U.S. Application Data

(63) Continuation of application No. 13/836,320, filed on Mar. 15, 2013, now Pat. No. 8,939,056.

(60) Provisional application No. 61/636,197, filed on Apr. 20, 2012.

(51) Int. Cl.
| | |
|---|---|
| *F42B 12/44* | (2006.01) |
| *G05D 1/10* | (2006.01) |
| *B64C 31/02* | (2006.01) |
| *B64D 17/80* | (2006.01) |
| *G05D 1/04* | (2006.01) |
| *G05D 1/08* | (2006.01) |

(52) U.S. Cl.
CPC .......... *G05D 1/105* (2013.01); *B64C 31/02* (2013.01); *B64D 17/80* (2013.01); *G05D 1/042* (2013.01); *G05D 1/0808* (2013.01)

(58) Field of Classification Search
CPC ... B64C 2201/102; B64C 39/024; B64D 1/02; F42B 12/362; F42B 12/44
USPC ............. 89/1.51, 1.11; 114/20.1; 102/351, 102/386–387
See application file for complete search history.

(56) References Cited

U.S. PATENT DOCUMENTS

| | | | | |
|---|---|---|---|---|
| 3,065,672 | A * | 11/1962 | Fitzgerald ............... | B64D 1/02 244/137.4 |
| 4,026,188 | A * | 5/1977 | Woodruff ............. | B63B 22/003 102/351 |
| 4,423,660 | A * | 1/1984 | Ouellette ............... | F42B 10/56 89/1.51 |
| 4,471,923 | A * | 9/1984 | Hoppner ................ | F41F 3/042 244/3.1 |
| 4,730,793 | A * | 3/1988 | Thurber, Jr. ......... | B64C 39/024 244/3.1 |
| 5,012,717 | A * | 5/1991 | Metersky ............... | F41G 7/008 114/21.1 |

(Continued)

*Primary Examiner* — Michael David
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, providing a guided descent from a release zone and toward an entry zone.

32 Claims, 12 Drawing Sheets

(56) References Cited

U.S. PATENT DOCUMENTS

| | | | | |
|---|---|---|---|---|
| 5,118,052 A * | 6/1992 | Alvarez | B64C 1/30 | 244/120 |
| 5,344,105 A * | 9/1994 | Youhanaie | F41G 7/346 | 244/3.14 |
| 5,487,350 A * | 1/1996 | Chace, Jr. | B63G 8/001 | 114/330 |
| 5,490,473 A * | 2/1996 | Chace, Jr. | B63G 8/001 | 114/330 |
| 5,537,947 A * | 7/1996 | Couture | B63B 22/003 | 114/20.1 |
| 5,600,087 A * | 2/1997 | Chace, Jr. | F41J 9/04 | 114/20.1 |
| 5,795,203 A * | 8/1998 | Suppa | B63B 22/22 | 441/1 |
| 5,866,838 A * | 2/1999 | Mayersak | F41G 7/007 | 89/1.51 |
| 5,878,979 A * | 3/1999 | Fisher | B64D 17/80 | 244/139 |
| 6,037,899 A * | 3/2000 | Weber | F41G 3/142 | 244/3.2 |
| 6,056,237 A * | 5/2000 | Woodland | B64C 3/40 | 244/120 |
| 6,082,675 A * | 7/2000 | Woodall, Jr. | B64D 1/02 | 244/120 |
| 6,134,183 A * | 10/2000 | Travor | G01S 1/72 | 367/4 |
| 6,142,411 A * | 11/2000 | Cobleigh | F41A 17/08 | 244/3.14 |
| 6,237,496 B1 * | 5/2001 | Abbott | F42B 10/64 | 102/384 |
| 6,260,797 B1 * | 7/2001 | Palmer | B64C 39/024 | 102/501 |
| 6,293,202 B1 * | 9/2001 | Woodall | F42B 19/01 | 102/386 |
| 6,338,457 B1 * | 1/2002 | Hilliard | B64D 17/80 | 244/137.4 |
| 6,392,213 B1 * | 5/2002 | Martorana | B64C 39/024 | 244/13 |
| 6,498,767 B2 * | 12/2002 | Carreiro | B63B 22/003 | 244/137.4 |
| 6,587,762 B1 * | 7/2003 | Rooney | B64D 1/08 | 235/375 |
| 6,655,313 B1 * | 12/2003 | Woodall | B63G 8/22 | 114/312 |
| 6,889,942 B2 * | 5/2005 | Preston | B64D 1/14 | 244/152 |
| 7,262,395 B2 * | 8/2007 | Bilyk | B63B 22/003 | 244/14 |
| 7,493,843 B2 * | 2/2009 | Grosch | B62D 57/036 | 89/1.13 |
| 7,703,720 B2 * | 4/2010 | Smith | B64D 17/343 | 102/387 |
| 7,854,410 B2 * | 12/2010 | Fanucci | B64C 39/024 | 244/139 |
| 8,117,955 B2 * | 2/2012 | Roemerman | B64D 1/06 | 89/1.54 |
| 8,127,683 B2 * | 3/2012 | Tepera | F42B 12/60 | 102/351 |
| 8,274,023 B2 * | 9/2012 | Gazard | F41G 7/34 | 244/1 R |
| 8,443,727 B2 * | 5/2013 | Roemerman | F42B 10/64 | 102/222 |
| 8,492,692 B2 * | 7/2013 | Fisher | B64C 39/024 | 244/13 |
| 8,541,724 B2 * | 9/2013 | Roemerman | F42B 10/64 | 244/3.16 |
| 8,608,112 B1 * | 12/2013 | Levay | B64D 17/343 | 244/149 |
| 8,635,957 B2 * | 1/2014 | Orlev | F42B 10/04 | 102/364 |
| 8,661,980 B1 * | 3/2014 | Roemerman | F42B 12/64 | 102/489 |
| 8,708,285 B1 * | 4/2014 | Carreiro | B64C 39/028 | 244/190 |
| 8,876,039 B2 * | 11/2014 | Lubenow | B64C 39/024 | 244/3.28 |
| 8,888,035 B2 * | 11/2014 | Lind, Jr. | B60F 3/00 | 244/13 |
| 8,939,056 B1 * | 1/2015 | Neal, III | F42B 15/22 | 102/387 |
| 8,985,504 B2 * | 3/2015 | Tao | B64C 3/44 | 244/3.28 |
| 9,056,679 B1 * | 6/2015 | Langston | B64D 1/12 | |
| 2007/0018033 A1 * | 1/2007 | Fanucci | F42B 10/143 | 244/3.27 |

\* cited by examiner

10300

11300

14000
14300    14400
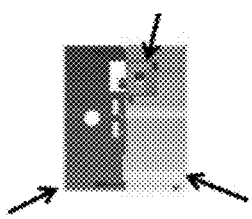    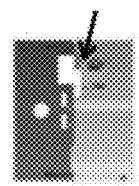
14100    14200
FIG. 14A    FIG. 14B
14500    14400    14500
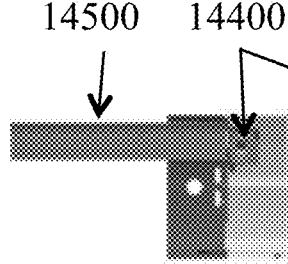        
14400
FIG. 14C    FIG. 14D    FIG. 14E

15000

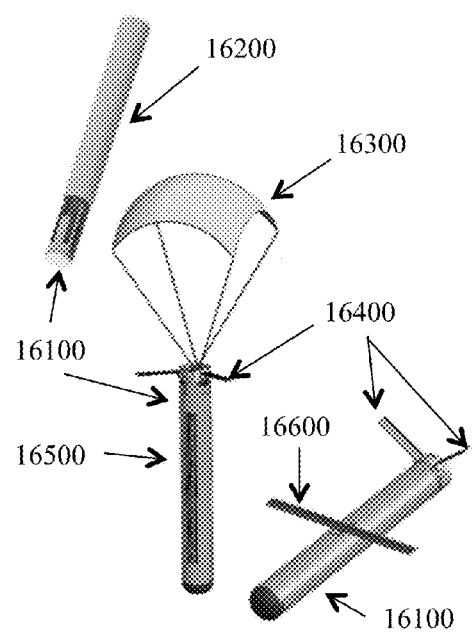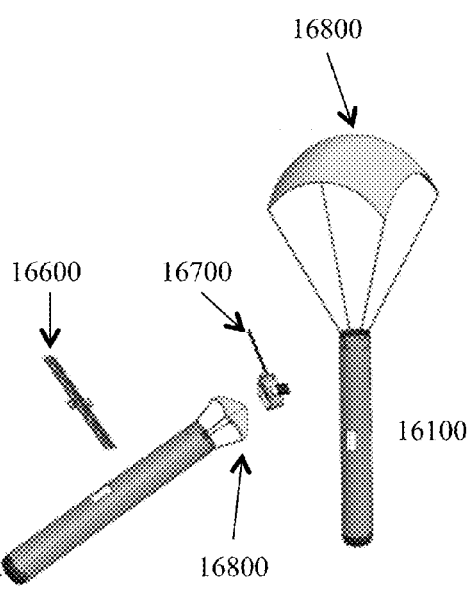

SYSTEMS, DEVICES, AND/OR METHODS FOR MANAGING TARGETED PAYLOAD DESCENT

CROSS-REFERENCES TO RELATED APPLICATIONS

This application claims priority to, and incorporates by reference herein in its entirety, U.S. Provisional Patent Application 61/636,197, filed 20 Apr. 2012.

STATEMENT OF GOVERNMENTAL SUPPORT

This invention was made with government support under contracts N68335-12-C-0193 and N68335-11-C-0059 awarded by the U.S. Navy. The government has certain rights in the invention.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIGS. 14A-E are side views of an exemplary embodiment of a modified parachute housing;

FIGS. 16A-E are perspective views of an exemplary embodiment of a sonobuoy deployment sequence;

DESCRIPTION

Certain exemplary embodiments can provide a tube-launched integrated sonobuoy glide harness (ISG) and/or one or more online adaptive guidance algorithms.

Certain exemplary embodiments can provide a tube-launched sonobuoy vehicle comprising an integrated sonobuoy glide harness (ISG) mechanism operably mounted to and substantially containing a naval sonobuoy. The ISG can be adapted for adaptively guiding the sonobuoy from a launch tube of an in-flight aircraft to a predetermined water-entry location. A high altitude sonobuoy vehicle release can improve the safety of the transport aircraft by increasing the standoff distance from enemy targets. When released from high altitudes, the sonobuoy vehicle can transport the sonobuoy for several nautical miles. Multiple sonobuoy vehicles can be launched and/or released from a common deployment mechanism and/or point on the aircraft and/or the aircraft's flight path. Each launched sonobuoy vehicle can utilize an onboard adaptive guidance algorithm to navigate its sonobuoy to a predetermined, unique, and/or precise water entry location defined by a predetermined water entry longitude and a predetermined water entry latitude. A group of deployed sonobuoys can establish a sonobuoy defense pattern within a predetermined water entry region and/or zone, that region and/or zone potentially defined by a predetermined range of water entry longitudes and/or a predetermined range of water entry latitudes.

Figures 1A, 1B, 1C:
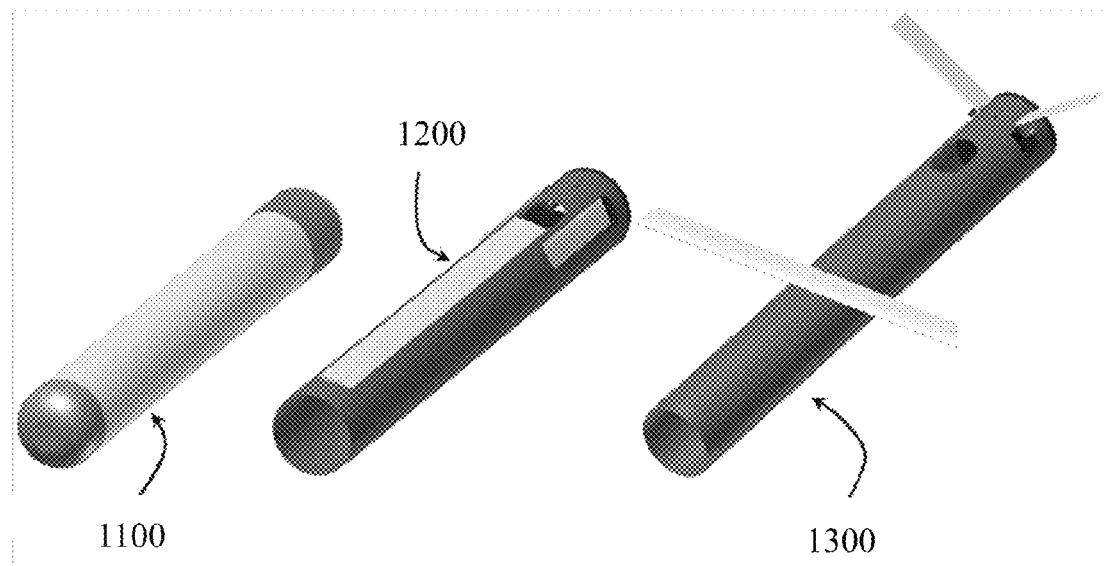
FIG. 1A is a perspective view of an exemplary sonobuoy internal module.
FIG. 1B is a perspective view of an exemplary integrated sonobuoy glide harness with stowed aerodynamic surfaces (ISG)
FIG. 1C is a perspective view of an exemplary integrated sonobuoy glide harness with deployed aerodynamic surfaces (ISG)

FIG. 1A, FIG. 1B, and FIG. 1C are respective perspective views of an exemplary sonobuoy internal module 1100, an exemplary ISG 1200 with stowed wing and tail surfaces, and an exemplary ISG 1300 with deployed wing and tail surfaces.

Figures 2A, 2B, 2C:
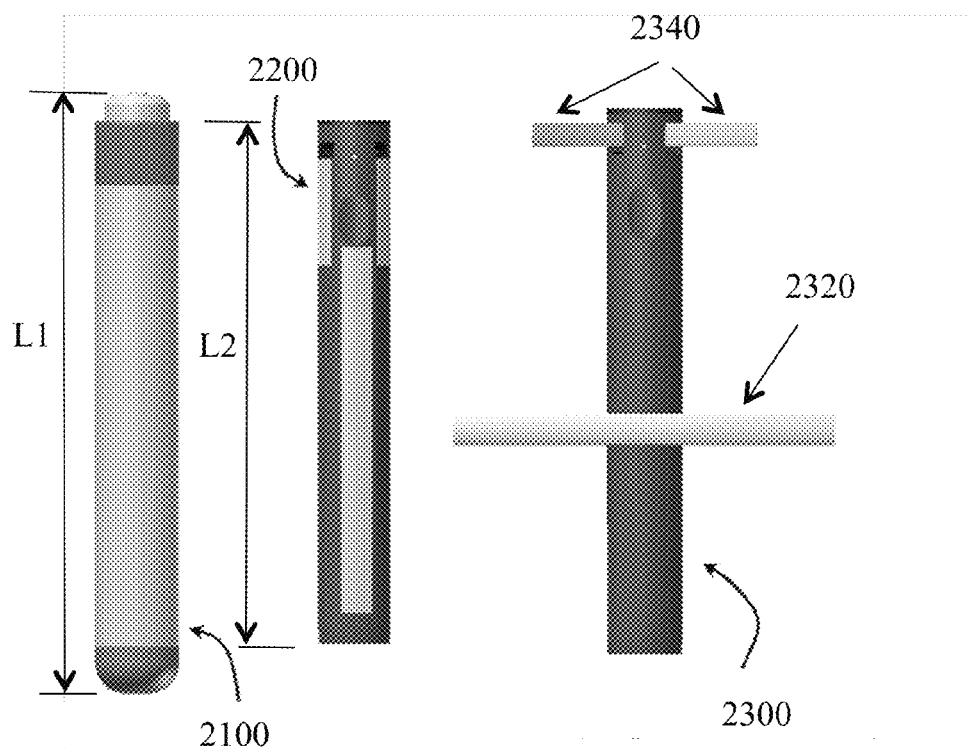
FIG. 2A is a top view of an exemplary sonobuoy internal module.
FIG. 2B is a top view of an exemplary integrated sonobuoy glide harness with stowed aerodynamic surfaces (ISG)
FIG. 2C is a top view of an exemplary integrated sonobuoy glide harness with deployed aerodynamic surfaces (ISG)

FIG. 2A, FIG. 2B, and FIG. 2C are respective top views of an exemplary sonobuoy internal module 2100 (having a length L1), an exemplary ISG 2200 (having a length L2) with stowed wing and tail surfaces, and an exemplary ISG 2300 with deployed wing (2320) and tail (2340) surfaces.

Figures 3A, 3B:
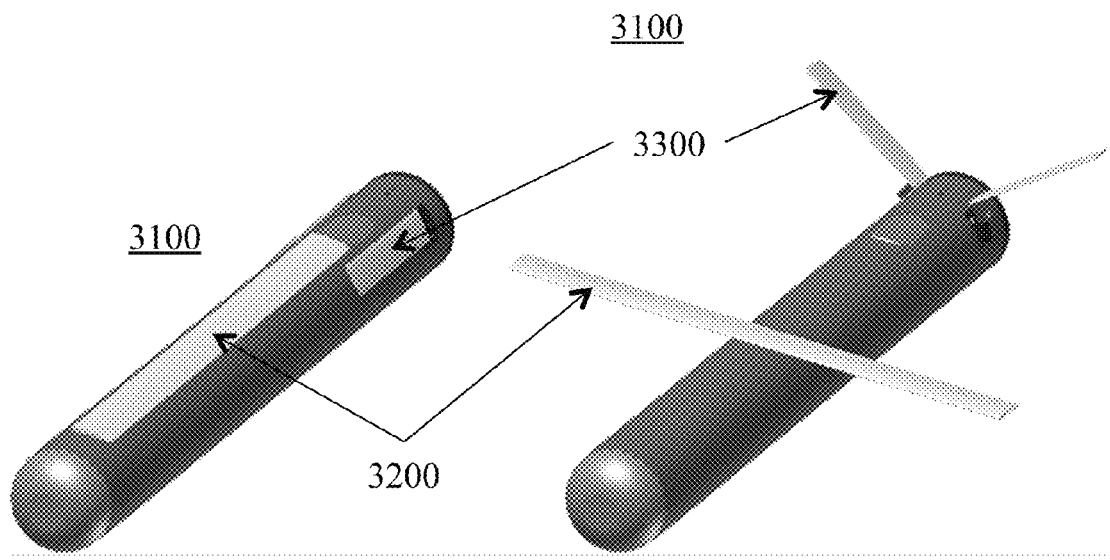
FIG. 3A is a perspective view of an exemplary sonobuoy internal module mounted within an exemplary ISG with stowed aerodynamic surfaces.
FIG. 3B is a perspective view of an exemplary sonobuoy internal module mounted within an exemplary ISG with deployed aerodynamic surfaces.

FIG. 3A and FIG. 3B are perspective views of an exemplary sonobuoy internal module mounted within an exemplary ISG to form a sonobuoy vehicle 3100. FIG. 3A shows the ISG wing 3200 and tails 3300 stowed. FIG. 3B shows the ISG wing 3200 and tails 3300 deployed.

Figure 4:
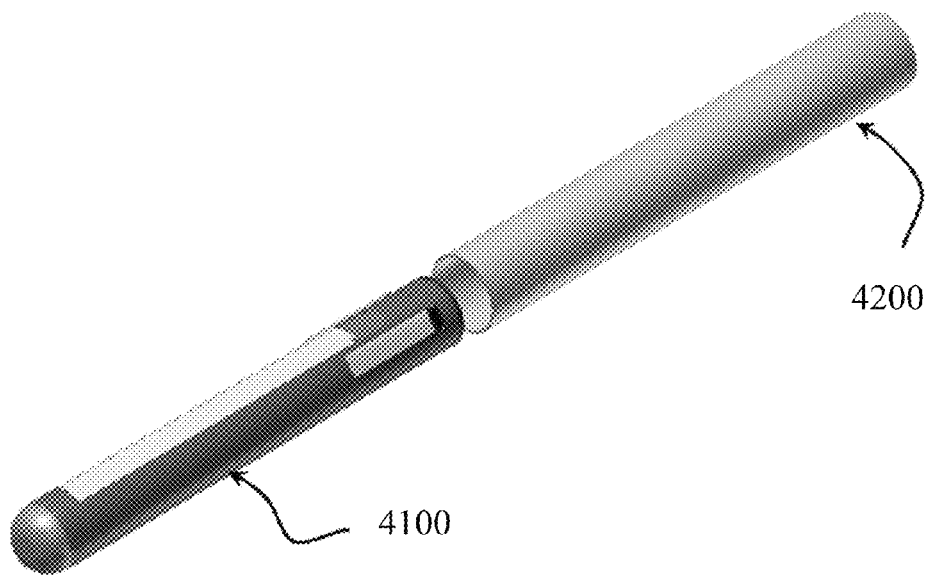
FIG. 4 is a perspective view of an exemplary vehicle fitting within an exemplary SLC.

FIG. 4 is a perspective view of an exemplary sonobuoy vehicle 4100 fitting within an exemplary sonobuoy launch container ("SLC") 4200. Typically, only vehicle 4100 is deployed in-flight and SLC 4200 remains secured within an aircraft launch tube (shown in FIG. 6).

Figure 5:
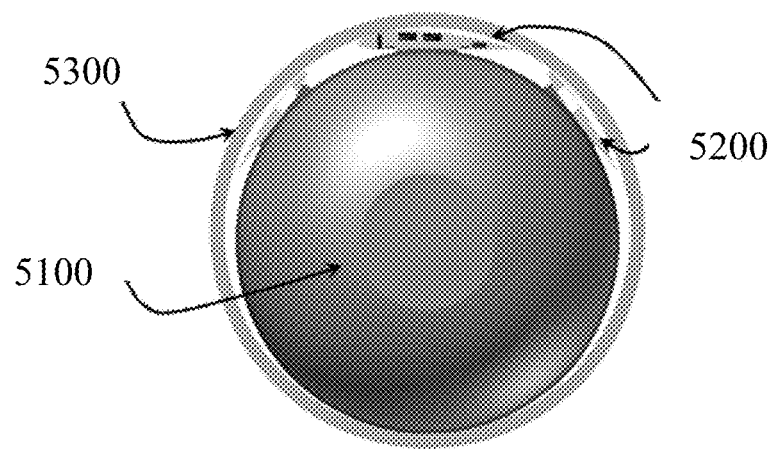
FIG. 5 is a front view of exemplary sonobuoy internal module, mounted within exemplary ISG, sitting within exemplary SLC

FIG. 5 is a front view of an exemplary sonobuoy internal module 5100, mounted within an exemplary ISG 5200, and located within an exemplary SLC 5300.

Figure 6:
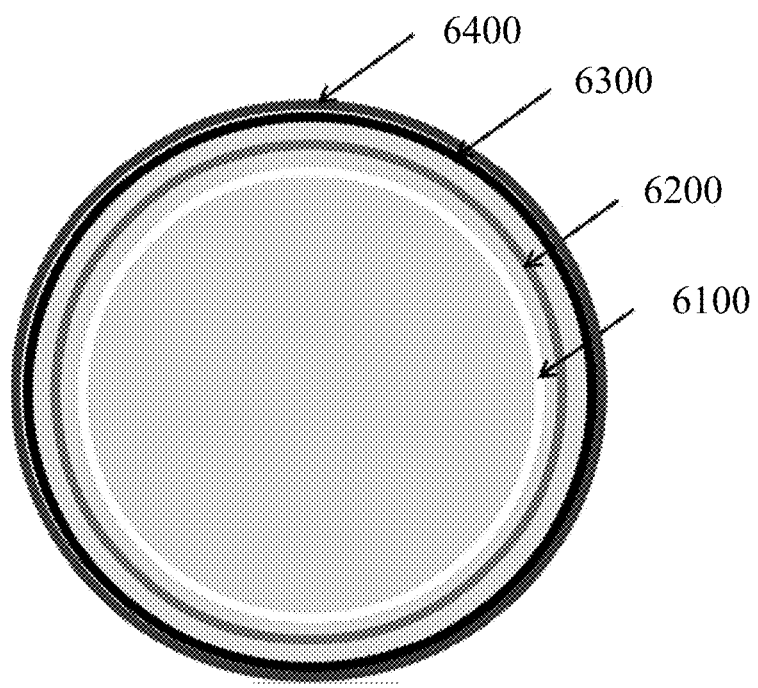
FIG. 6 is an end-on view of exemplary launch tube, SLC, ISG, and sonobuoy internal module demonstrating exemplary nesting of the components.

FIG. 6 is a front view of an exemplary sonobuoy internal module 6100 nested within an exemplary ISG 6200, the ISG nested within an exemplary SLC 6300, the SLC nested within an exemplary aircraft launch tube 6400.

Referring to FIGS. 1-6, certain exemplary embodiments of the ISG can provide an integrated vehicle glide harness that can replace the external housing of a typical sonobuoy with a low-profile structure that can house and/or deploy aerodynamic lifting surfaces (see FIG. 1, FIG. 2, and FIG. 3) that are adapted to guide the sonobuoy to a predetermined water entry location. The operably combined sonobuoy internal module and ISG (sometimes referred to herein as a "vehicle") can be adapted to fit within a standard size-A Sonobuoy Launch Container (SLC) as shown in FIG. 4. The wing and/or tail surfaces of the glide harness can be located within the available empty volume that would otherwise exist between the sonobuoy and the SLC as shown in FIG. 5. The SLC does not deploy. It can mount within the aircraft launch tube. An exemplary nested configuration (sonobuoy internal module, ISG, SLC, and aircraft launch tube) is shown in FIG. 6.

The ISG can provide a gliding capability for a wide range of sonobuoy configurations with minimal to no impact on the sonobuoy internal module dimensions and/or manufacturing processes. That is, the ISG can be adapted to fit nearly any sonobuoy without requiring adaptation of the sonobuoy internal module. The sonobuoy internal module can fit inside the ISG to form a sonobuoy vehicle that can be deployed from a launch tube that is mounted on an aircraft (and/or other type of launch platform).

Immediately after launch, a stabilization parachute can be deployed and/or one or more tail control surfaces can be deployed from the rear of the vehicle and/or can be used to orient the vehicle and/or pitch it up into the attitude required for gliding. Before, during and/or after deployment of the tail control surface(s), ISG control instructions can command a main wing located on the ISG to be rotated from a stowed position into a deployed configuration.

Certain exemplary embodiments of one or more online adaptive guidance algorithms (described in detail below), which can be implemented via an ISG control system comprising machine-implemented ISG control instructions, can utilize knowledge of the vehicle position, velocity, attitude, and/or capabilities to plan a descent trajectory that can place the vehicle within the desired touchdown zone and/or region. The ISG control instructions for implementing the algorithms can be embedded onboard the vehicle (e.g., within a memory device (such as a ROM chip) communicatively coupled to a special purpose processor and/or controller that is resident in an information device located in the ISG), and/or can compute a reference trajectory in real-time. There need be no requirement for pre-planning the vehicle trajectory. The ISG control instructions can utilize sensor measurements to determine the current vehicle position and/or velocity. Once the position is substantially known relative to the desired and/or target water touchdown location, the ISG control instructions can compute bank and/or lateral acceleration commands to align the velocity heading vector with that water touchdown location. Once the vehicle and/or its velocity heading is substantially aligned with the target, the ISG control instructions can issue normal acceleration commands to adjust the vehicle sink rate to accurately and/or appropriately impact the target. The ISG control instructions can continue to produce updated bank, lateral acceleration, and/or normal acceleration commands at a very rapid update rate. This can allow the control system to adapt to vehicle performance characteristics and/or external environmental conditions, such as can be caused by uncertainties in the vehicle model, winds, turbulence, precipitation, icing, waves, water spray, smoke, geological formations, watercraft, and/or defensive mechanisms, etc.

Figure 7:
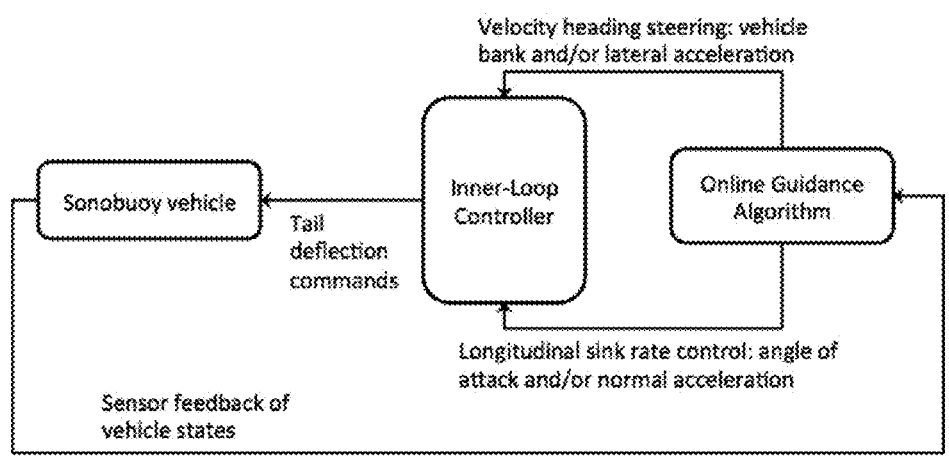
FIG. 7 is a block diagram of an exemplary guidance and control system.

Certain exemplary embodiments of the ISG control instructions can utilize variations in the steepness of the descent glide-slope and/or additions of spirals to achieve the desired touchdown conditions. Certain exemplary methods of the ISG control instructions can minimize the descent time to achieve touchdown, allowing rapid deployment and/or minimizing risks to the vehicle while airborne. An exemplary algorithm architecture and/or system 7000 is presented in the block diagram of FIG. 7.

Certain exemplary embodiments of the ISG control instructions can produce a continuously updated lateral acceleration or normal acceleration command to correct the vehicle orientation. This real-time guidance command updating combined with precision inner-loop control tracking can lead to a robust algorithm that functions well in environments with high levels of uncertainties caused by winds, turbulence, precipitation, icing, waves, water spray, smoke, geological formations, watercraft, and/or defensive mechanisms, etc.

The ISG control instructions can take the current vehicle states and can compute the necessary change in velocity heading angle and/or, vehicle flight path angle to arrive at the target (described below). These computed changes can be transformed by the ISG control instructions into a bank and/or lateral acceleration command to achieve the velocity heading change command, and/or an angle-of-attack command, and/or normal acceleration command to achieve the desired vehicle flight path angle (described below). Any such command can be passed directly through to the inner-loop control portion of the ISG control instructions.

Figures 8A, 8B:
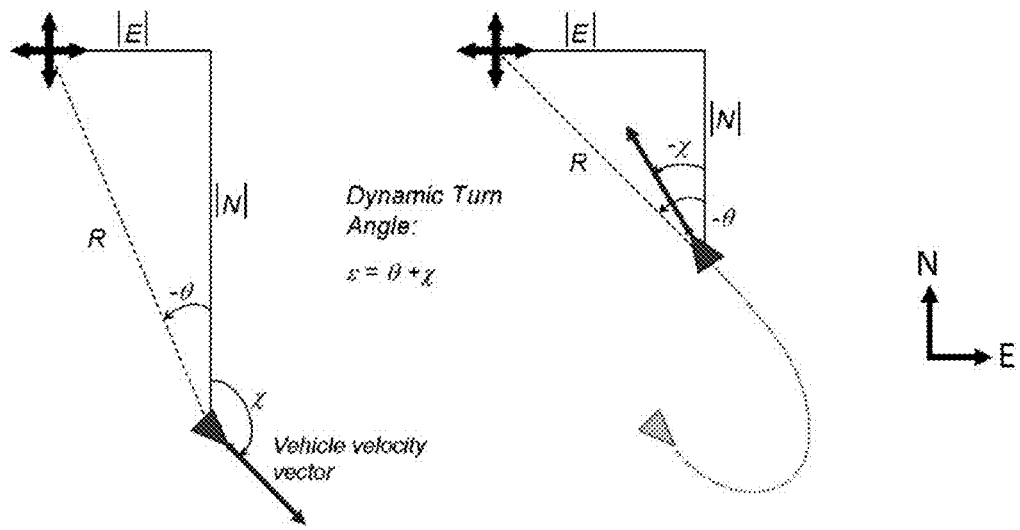
FIG. 8 is a vector diagram of an exemplary lateral heading control logic.

The ISG guidance control logic, algorithms, and/or instructions can be divided into a lateral tracking module and a longitudinal tracking module. The lateral tracking module can reduce the turn angle between the vehicle velocity heading vector and the straight-line position vector between the vehicle and the target projected onto, for example, a North-East plane. FIGS. 8A and 8B illustrates the lateral tracking concept. As shown in FIG. 8A a control law such as a dynamic inversion control, can be used to generate the appropriate bank and/or lateral acceleration command to drive the turn angle, $\epsilon$, to zero (described below). The lateral acceleration and/or bank command can change the velocity heading direction $\chi$ while the vehicle is moving in the North-East plane. As shown in FIG. 8B, with appropriate lateral steering and/or banking eventually the direction of the velocity vector can align with the position vector of the vehicle relative to the target.

Figure 9:
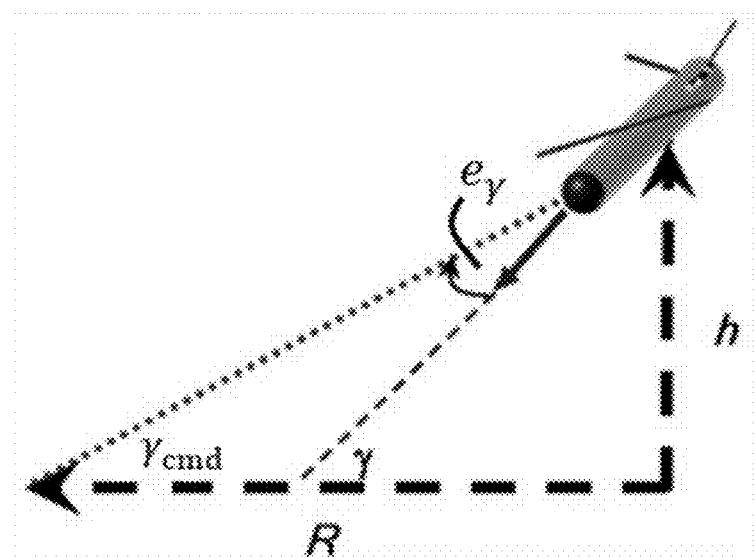
FIG. 9 is a vector diagram of an exemplary longitudinal control logic.

The control law can require computing a stable first-order error dynamic for the turn angle error so that it will asymptotically approach zero as shown below:

$$\epsilon = \theta + \chi$$

$$e_\epsilon = \epsilon_K - \epsilon = -\epsilon$$

$$\dot{e}_\epsilon = K e_\epsilon = -\dot{\theta} - \dot{\chi} \qquad \text{Equation Set 1}$$

where:
   $\epsilon$=turn angle; the angle between the velocity heading direction and the vehicle-target position vector direction
   $e_\epsilon$=turn angle error
   $\theta$=position angle; the angle of vehicle-target position vector in the North-East plane
   $\chi$=velocity heading angle in North-East plane
   $\epsilon_c$=commanded turn angle (zero by definition)
   K=positive control gain to create a stable error dynamic The position angle rate, $\dot{\theta}$, and the velocity heading angle rate, $\dot{\chi}$, can be defined and substituted into the error dynamic definition from Equation Set 1 to determine an appropriate bank and/or lateral acceleration command. The resulting bank and/or lateral acceleration command can attenuate the turn angle error, $\chi$, in order to align the velocity heading with the target:

$$\theta = \tan^{-1}\frac{E}{N} \Rightarrow \dot{\theta} - f_\theta \quad \text{Equation Set 2}$$

$$\dot{\chi} = \frac{L\sin(\mu)g}{V\cos\gamma}$$

$$\dot{e}_\varepsilon = -Ke_\varepsilon = -\dot{\theta} - \dot{\chi} = -f_\theta - \frac{L\sin(\mu)g}{V\cos\gamma}$$

$$\mu = \sin^{-1}\left(\frac{V\cos\gamma}{Lg}(Ke_\varepsilon + f_\theta)\right)$$

$$\theta = \tan^{-1}\frac{E}{N} \Rightarrow \dot{\theta} - f_\theta$$

$$\dot{\chi} = \frac{A_y g}{V\cos\gamma}$$

$$\dot{e}_\varepsilon = -Ke_\varepsilon = -\dot{\theta} - \dot{\chi} = -f_\theta - \frac{A_y g}{V\cos\gamma}$$

$$A_y = \frac{V\cos\gamma}{g}(Ke_\varepsilon + f_\theta)$$

where:
 L=vehicle lift magnitude
 $\mu$=vehicle bank angle
 $A_y$=lateral acceleration
 g=gravity
 V=vehicle velocity magnitude
 $\gamma$=vehicle flight path angle
 N=North position error between vehicle and target
 E=East position error between vehicle and target
 $f_\theta$=position angle rate, a function of North and East position and rate errors The ISG longitudinal guidance control logic, algorithms, and/or instructions can operate in two phases. Phase 0 can persist while the vehicle is doing the initial banking and/or turning to align with the target. During this phase the vehicle sink rate command, which can be represented by the velocity flight path angle, can correspond to the quasi-equilibrium glide solution (described below) for the vehicle. This can be considered to be the optimal range flight path angle given the current vehicle orientation. This can help to conserve energy during the initial velocity heading alignment. Once the turn angle drops below a specified threshold, such as approximately one degree, the vehicle can go into Phase 1, which can consist of maintaining the velocity heading alignment while adjusting the vehicle sink rate (flight path angle) to intersect the target. A graph showing an exemplary longitudinal control logic is illustrated in FIG. 9.

The quasi-equilibrium glide solution can be considered to be the equilibrium point of the flight path and dynamic pressure state equations as a function of the glide-scale, $\eta$, as shown below:

$$\dot{\gamma}=f_1(\gamma,\bar{q})\equiv 0$$

$$\dot{\bar{q}}=f_2(\gamma,\bar{q})\equiv 0 \quad \text{Equation Set 3}$$

$$\gamma_{eq} \approx \tan^{-1}\left(\frac{-1}{\eta\left(\frac{C_L}{C_D}\right)^*\cos\mu}\right) \quad \text{Equation Set 4}$$

$$\bar{q}_{eq} \approx \frac{W_s \cos\gamma_{eq}}{\eta C_L^* \cos\mu}$$

where:
 $\gamma$=Flight path angle
 $\bar{q}$=Dynamic Pressure
 $\mu$=Bank angle
 $W_s$=S/mg=Wing loading
 $(C_L/C_D)^*$=the value at maximum L/D.

It is apparent from Equation Set 4 that increasing $\eta$ towards the numerical value 1 brings the denominator closer to the maximum L/D value leading to a shallow glide angle that can conserve range capacity.

During Phase 0 the flight path result from Equation group 4 can be evaluated for a glide scale of one. This equilibrium result can help determine what the achievable flight path angle is for the vehicle. If the vehicle is commanded to follow too shallow a flight path angle, drag can build up and/or the dynamic pressure can rapidly fall below what is required to maintain the vehicle lift. The aircraft can drop rapidly until a new equilibrium state is achieved. By tracking the flight path angle command from Equation group 4 the vehicle can fly an appropriate trajectory.

Once the vehicle and/or the velocity heading is approximately aligned with the target, Phase I sink rate control can begin. This can be accomplished by computing the required flight path angle to cover the remaining range given the current altitude. As long as the vehicle is on a straight line trajectory to the target with no winds or other imposing forces the flight path command can be:

$$\gamma_{cmd} = -\tan^{-1}\left(\frac{h}{R}\right) R = \sqrt{N^2 + E^2} \quad \text{Equation Set 5}$$

where:
 $\gamma_{cmd}$=flight path angle command
 h=current vehicle altitude
 R=vehicle distance to target
 N=North position error between vehicle and target
 E=East position error between vehicle and target Because Equation Set 5 can be updated in real-time, even if winds or other environmental conditions are present and force the vehicle off-course, the continuous guidance corrections can attempt to bring the vehicle to the touchdown point, region, and/or zone accurately.

In Phase 0 and/or Phase I, a controller comprised by the ISG control instructions can be used to compute the appropriate angle-of-attack and/or normal acceleration command to drive the flight path angle to the commanded value. That controller can begin by defining an error signal between the desired flight path angle and the current state value. To drive this error signal to zero the derivative of the error can be computed and/or forced to satisfy an exponential decay. Algebraic manipulation then can lead to a formulation for the desired lift and/or normal acceleration to achieve the commanded flight path angle. The vehicle trim lift curve is interpolated to determine the angle-of-attack corresponding to the desired lift, such as follows:

$$e_\gamma = \gamma_{cmd} - \gamma \quad \text{Equation Set 6}$$

$$\dot{e}_\gamma = \dot{\gamma}_{cmd} - \dot{\gamma} = -k_\gamma e_\gamma$$

$$\dot{\gamma} = \frac{L\cos(\mu)}{mV} - \frac{g\cos\gamma}{V}$$

$$L = \frac{mV}{\cos(\mu)}(\dot{\gamma}_{cmd} + k_\gamma e_\gamma + g\cos\gamma)$$

$$\alpha_{cmd} = \text{interpolate}(L_{trim}, \alpha_{trim}, L)$$

-continued $$e_\gamma = \gamma_{cmd} - \gamma$$

$$\dot{e}_\gamma = \dot{\gamma}_{cmd} - \dot{\gamma} = -k_\gamma e_\gamma$$

$$\dot{\gamma} = \frac{A_n g}{V} - \frac{g\cos\gamma}{V}$$

$$\dot{\gamma}_{cmd} - \frac{g}{V}(A_n - \cos\gamma) = -k_\gamma e_\gamma$$

$$A_n = \cos\gamma + \frac{V}{g}(\dot{\gamma}_{cmd} + k_\gamma e_\gamma)$$

where:
$e_\gamma$=flight path angle error
$\gamma$=vehicle flight path angle
$\gamma_{cmd}$=commanded flight path angle
$k_\gamma$=positive control gain to stabilize flight path tracking error dynamic
L=vehicle lift magnitude
$\mu$=vehicle bank angle
$A_n$=normal acceleration
g=gravity
V=vehicle velocity magnitude
$\alpha_{trim}$=vector of trim angle-of-attack values
$L_{trim}$=vector of trim lift values corresponding to trim angle-of-attack values
$\alpha_{cmd}$=commanded angle-of-attack The control logic in Equation Set 6 can provide rapid tracking of the commanded flight path angle, potentially limited only by the vehicle pitch dynamics. As long as the velocity heading is approximately aligned with the target, the flight path command in Equation Set 5 can accurately command the vehicle to drive R→0 as altitude decreases to zero. Throughout the vehicle descent, the flight path command can be updated to reflect the current position and/or altitude. The flight path command can ultimately converge on a constant value as the vehicle achieves the appropriate range and/or altitude. The lateral acceleration guidance can maintain the velocity heading alignment with the desired touchdown point, region, and/or zone.

A vehicle command module comprised by the ISG control instructions can provide a dynamic inversion controller to determine the appropriate pitch rate command, which can asymptotically track the angle of attack commands from guidance. Similar to the prior dynamic inversion formulations, the desired tracking state can be forced to conform to a stable error dynamic, such as follows:

$$e_\alpha = \alpha_{cmd} - \alpha \quad \text{Equation Set 7}$$

$$\dot{e}_\alpha = \dot{\alpha}_{cmd} - \dot{\alpha} = -k_\alpha e_\alpha$$

$$\frac{1}{mV}(-C_L \bar{q} S + mg_3 + mVQ) = -k_\alpha e_\alpha$$

$$g_3 = (\sin\alpha\sin\theta + \cos\alpha\cos\phi\cos\theta)$$

$$Q^* = \frac{-mVk_\alpha e_\alpha + C_L \bar{q} S - mg_3}{mV}$$

The longitudinal and/or lateral acceleration commands can be sent to the inner-loop control module comprised by the ISG control instructions. The inner-loop control module can use standard control logic to track the longitudinal and/or acceleration commands already discussed.

Certain exemplary embodiments can provide an integration of the ISG with the sonobuoy internal module's external housing. This can conserve space so that the ISG can deploy from within a standard SLC form factor currently used for sonobuoy launch. This integration can allow the sonobuoy internal module to be used without requiring design modifications to reduce the size. This integration can allow a sonobuoy vehicle to be deployed using an SLC and aircraft and/or launch hardware currently deployed in the fleet. With the ISG, the deploying aircraft can have much greater flexibility in terms of the location from which sonobuoys are deployed from the aircraft while achieving the same final delivery location, region, and/or zone. The ISG can be used with multiple different current sonobuoy models.

Exemplary methods that utilize advanced guidance algorithms and/or instructions can quickly achieve an equilibrium glide condition that can result in the maximum range capability for the vehicle and/or the required glide condition to reach the desired touchdown point, region, and/or zone. The previously described guidance logic, algorithms, and/or instructions can achieve the glide condition from a variety of initial launch conditions, from vertical and/or horizontal and/or canted launch angles. Certain exemplary guidance strategies can utilize variations in the equilibrium glide conditions to quickly achieve the desired touchdown conditions for targets points near and/or far from the launch aircraft. Certain exemplary energy management techniques can achieve maximum range and/or minimum time touchdown using glide slope modulation and/or spiral ground-track planning.

Certain exemplary embodiments can allow sonobuoys to be deployed from existing military aircraft without modification to those aircraft. Aircraft release conditions can be from any altitude and/or velocity and/or flight path angle, within the limits of the glide range capability of the ISG, and/or from any azimuth relative to the desired touchdown point.

Certain exemplary embodiments can be operable without the use of a thrusted carrier vehicle and/or a parafoil delivery mechanism.

Certain exemplary embodiments can be rather minimally impacted by environmental conditions (e.g., wind and/or turbulence) and/or achieve a rapid deployment.

In certain exemplary embodiments, airfoils on the wing and/or tail surfaces can be changed. Modifications to the wing also can improve range. Wing geometry can be altered to have a longer span to provide higher aspect ratio and increase the maximum lift to drag ratio, increasing glide range. Wing geometry can be altered to have a shorter span for more rapid descent maneuvers with less glide range. Tail surfaces can be lengthened, shortened, and/or placed at different angles to adjust the aerodynamic stability and/or control characteristics.

Certain exemplary embodiments can be used to deliver other types of payloads, including but not limited to: drop-sondes used for atmospheric measurements. Certain exemplary embodiments can be used for precision delivery of medical supplies or ammunition in battlefield environments.

Certain exemplary embodiments can be deployed using the same aircraft/deployment hardware as a standard sonobuoy. Certain exemplary embodiments can carry the payload internally, rather than in the nose or underneath the air vehicle. Certain exemplary embodiments can use a rigid wing with high wing loading, which can provide much lower sensitivity to external disturbances. Certain exemplary embodiments can be unpowered.

Figures 10, 11:
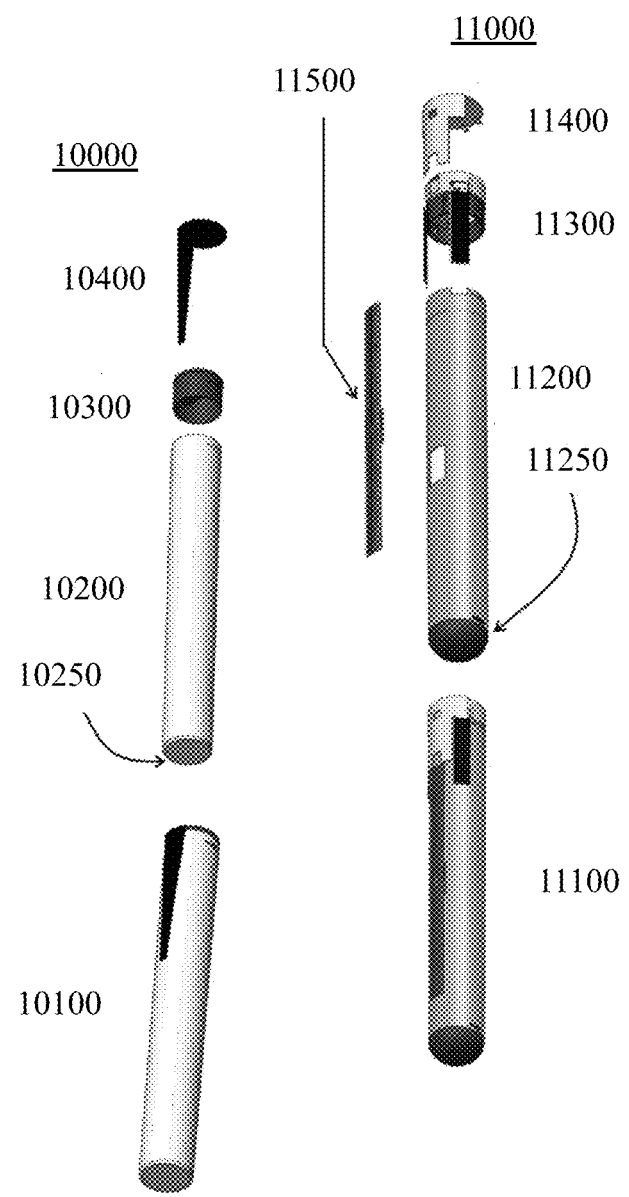
FIG. 10 is a side view of the original sonobuoy.
FIG. 11 is a side view of an exemplary embodiment of a modified sonobuoy vehicle.

FIGS. 10 and 11 are side views of various components of, in the case of FIG. 10, the original sonobuoy 10000 that can be replaced as described herein by, in the case of FIG. 11, various components of modified sonobuoy vehicle 11000.

Original housing 10100 can contain original external shell 10200, which can be terminated by a blunt end cap 10250. At an opposite longitudinal end of original external shell 10200 can be an original parachute housing 10300, to which an original windflap 10400 can attach. Modified external housing and/or glide harness 11100 can replace original housing 10100. Modified external shell 11200 can replace original external shell 10200. Aerodynamic hemispherical end cap 11250 can replace original blunt end cap 10250. Modified parachute housing 11300 can replace original parachute housing 10300. Modified windflap 11400 can replace original windflap 10400. Attached to modified external shell 11200 can be a wing attachment 11500.

Figure 12:
FIG. 12 is a perspective view of an original parachute housing.

FIG. 12 is a perspective view of original parachute housing 10300 of FIG. 10.

Figure 13:
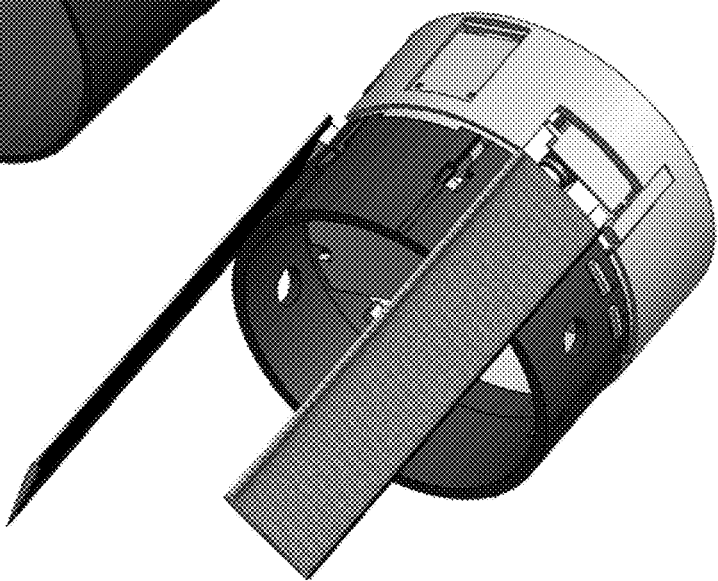
FIG. 13 is a perspective view of a modified parachute housing.

FIG. 13 is a perspective view of modified parachute housing 11300 of FIG. 11.

FIGS. 14A-E are side views of an exemplary embodiment of a modified parachute housing.

FIG. 14A shows an exemplary embodiment of an inner section 14100 of an exemplary embodiment of the modified parachute housing 14000, the inner section adapted to hold a terminal parachute and/or stay attached to the metal shell until ejected after the buoy and/or payload enters the water and/or a target region. Also shown is an exemplary embodiment of an outer section 14200 that is adapted to be attached to the inner section and/or to hold actuators 14300, tail surfaces, control hardware, and/or a stabilization parachute. In certain exemplary embodiments, the outer section can include one or more servomotors that are adapted to be attached to one or more deployable aerodynamic surfaces, such as one or more tail control surfaces. In certain exemplary embodiments, the outer section can include one or more drive mechanisms for releasing the stabilization parachute and/or for ejecting the outer section from the vehicle in flight.

In certain exemplary embodiments, once the sonobuoy vehicle is launched, the stabilization parachute can be deployed and then released once the vehicle sink rate is above a threshold value, then the vehicle can glide toward the target, and then the outer section of the modified parachute housing can be ejected from the inner section in flight. The process of ejecting the outer section can deploy a terminal parachute that can be mounted in the inner section of the modified parachute housing.

FIG. 14B shows an exemplary embodiment of the modified parachute housing 14000, where a servomotor 14400 is shown in a deployed position that is rotated out from the outer section by approximately 90 degrees.

FIG. 14C shows an exemplary embodiment of the modified parachute housing 14000 in a stowed state and with a tail 14500 attached to a servomotor 14400.

FIG. 14D shows an exemplary embodiment of the modified parachute housing 14000 in a partially deployed state and a servomotor and a tail 14500 unfolded from the housing.

FIG. 14E shows an exemplary embodiment of the modified parachute housing 14000 in a fully deployed state and with the servomotor 14400 and tail 14500 rotated into a flow direction of the sonobuoy vehicle, in which each servomotor can actively rotate its corresponding tail to control the sonobuoy vehicle.

Figure 15A:
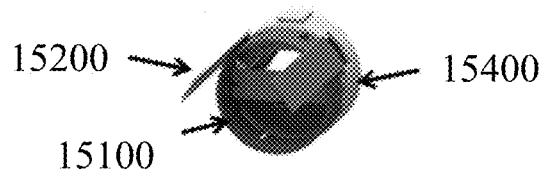
FIGS. 15A-C are perspective views of an exemplary embodiment of a modified parachute housing.
Figure 15B:
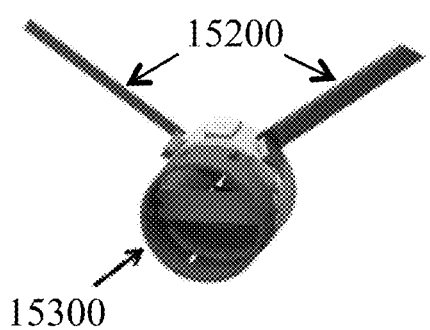
Figure 15C:
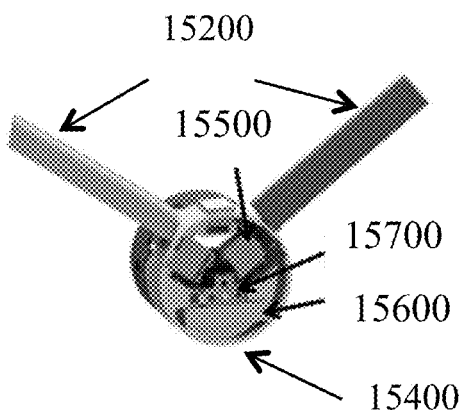

FIGS. 15A-C are perspective views of an exemplary embodiment of a modified parachute housing 15000.

FIG. 15A shows two tail control surfaces 15200 folded along an outer surface of the metal shell 15100, such as when the sonobuoy vehicle is stowed inside a sonobuoy launch container. Also shown is outer section 15400.

FIG. 15B shows the two tail control surfaces 15200 unfolded and rotated into the airflow. Also shown is the internal section 15300, which can hold a terminal parachute and can be ejected when a float in the internal module expands. The internal section 15300 of the modified parachute housing 15000 can resemble a shortened version of the internal section of the original parachute housing, except the shortened version can operably attach to the outer section 15400.

FIG. 15C shows the two tail control surfaces 15200 unfolded and rotated into the airflow. Also shown is the outer section 15400 of the modified parachute housing 15000, which can hold a plurality of servomotors 15500, each of which adapted to control one or more tail control surfaces 15200. Also held by the outer section 15400 can be guidance navigation and/or control hardware 15600, which can be mounted on a printed circuit board. The outer section 15400 of the modified parachute housing 15000 can be separated from the inner section 15300 upon ejection of the outer section 15400 using drive mechanisms mounted within the outer section 15400. The outer section 15400 can include an attachment point 15700 for the stabilization parachute.

FIGS. 16A-E are perspective views of an exemplary embodiment of a sonobuoy deployment sequence 16000.

FIG. 16A shows an exemplary embodiment of a sonobuoy vehicle 16100 as stowed and deploying from a sonobuoy launch container 16200.

FIG. 16B shows an exemplary embodiment of a sonobuoy vehicle 16100 after deployment, with the stabilization parachute 16300 deployed and the tails 16400 unfolded from the body 16500.

FIG. 16C shows an exemplary embodiment of a sonobuoy vehicle 16100 after ejecting the stabilization parachute, rotating the tails 16400 into the airflow, deploying the main wing 16600, and while engaging in a gliding descent.

FIG. 16D shows an exemplary embodiment of a sonobuoy vehicle 16100 after the outer section 16700 of the modified parachute housing and the main wing 16600 have been ejected and upon initiation of deployment of the terminal parachute 16800.

FIG. 16E shows an exemplary embodiment of a sonobuoy vehicle 16100 with its terminal parachute 16800 fully deployed.

Figure 17:
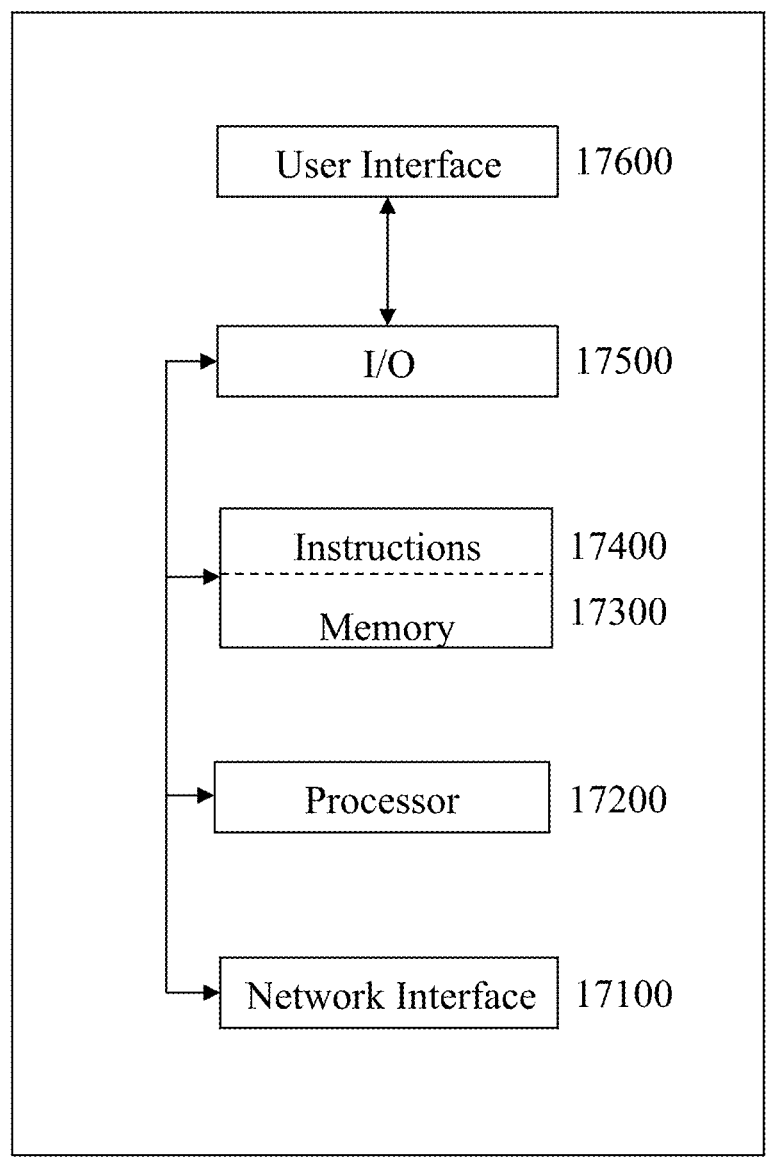
FIG. 17 is a block diagram of an exemplary embodiment of an information device.

FIG. 17 is a block diagram of an exemplary embodiment of an information device 17000, which in certain operative embodiments can be adapted to implement any algorithm described herein. Information device 17000 can comprise any of numerous transform circuits, which can be formed via any of numerous communicatively-, electrically-, magnetically-, optically-, fluidically-, and/or mechanically-coupled physical components, such as for example, one or more network interfaces 17100, one or more processors 17200, one or more memories 17300 containing instructions 17400, one or more input/output (I/O) devices 17500, and/or one or more user interfaces 17600 coupled to I/O device 17500, etc.

In certain exemplary embodiments, via one or more user interfaces 17600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Figure 18:
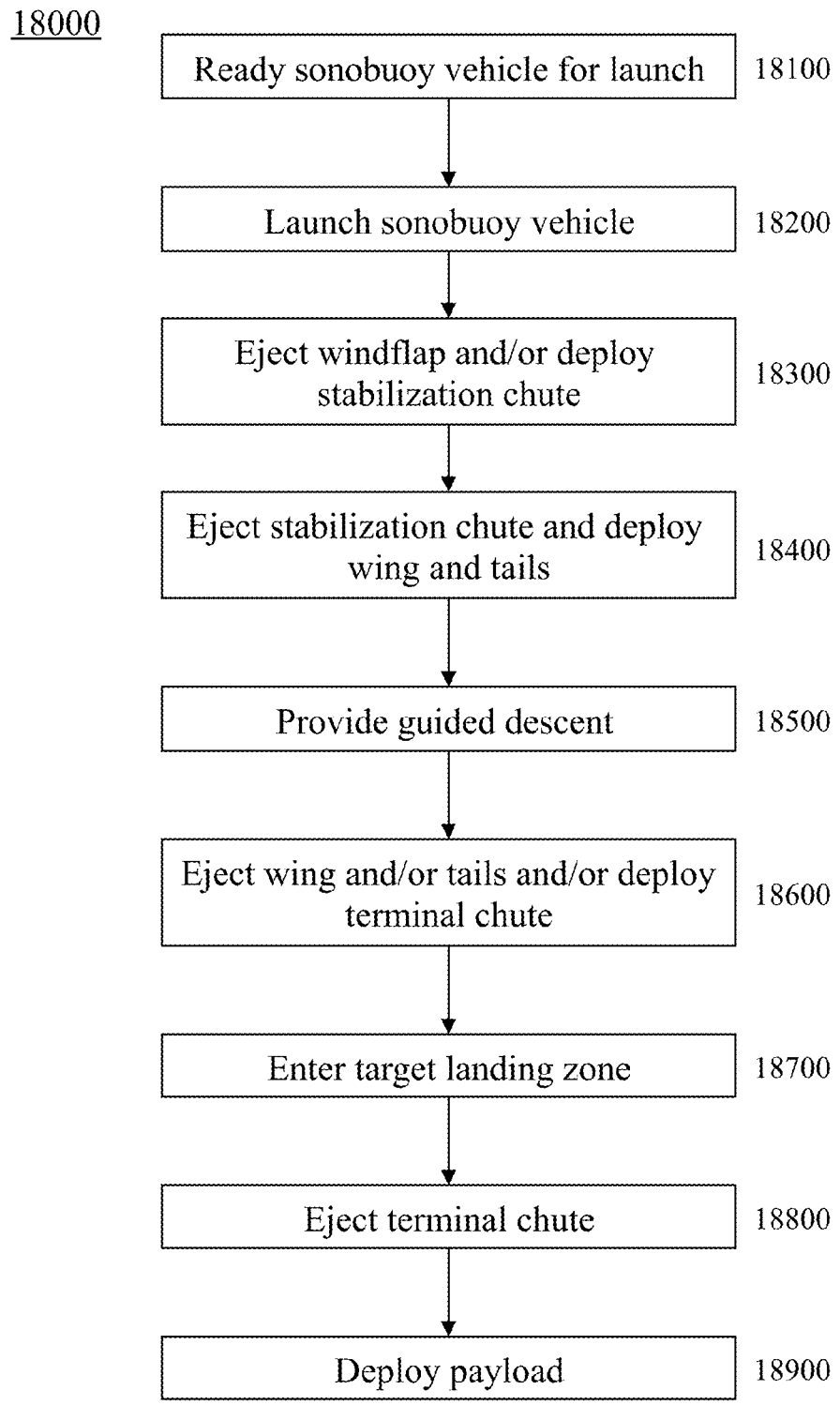
FIG. 18 is a flowchart of an exemplary embodiment of a method.

FIG. 18 is a flowchart of an exemplary embodiment of a method 18000. At activity 18100, certain exemplary embodiments of a sonobuoy vehicle can be readied for launch, such as by being installed in a sonobuoy launch container. At activity 18200, the sonobuoy vehicle can be launched from the sonobuoy launch container. At activity 18300, the sonobuoy vehicle's windflap can be ejected and/or its stabilization parachute can be deployed. At activity 18400, the stabilization parachute can be ejected and/or the aerodynamic control surfaces can be deployed. At activity 18500, the sonobuoy vehicle can engage in a dynamically determined, substantially controlled, and substantially guided descent toward the target landing zone. At activity 18600, the aerodynamic control surfaces can be ejected and/or the terminal parachute deployed. At activity 18700, the sonobuoy can reach the target landing zone. At activity 18800, the terminal parachute can be ejected. At activity 18900, the sonobuoy's payload and/or sensors can be deployed.

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to:

a substantially cylindrical sonobuoy glide harness adapted to:
  be operably connected to a substantially cylindrical sonobuoy internal module to form a sonobuoy vehicle, the sonobuoy vehicle adapted to launch from a sonobuoy launch container that defines a sonobuoy launch container inner diameter, the sonobuoy vehicle defining a sonobuoy vehicle length and a sonobuoy vehicle outer diameter; and/or
  operatively replace a substantially cylindrical external housing that is operatively adapted to substantially surround the sonobuoy internal module, the external housing defining an external housing length and an external housing outer diameter, the sonobuoy vehicle length not exceeding the external housing length, the sonobuoy vehicle outer diameter not exceeding the sonobuoy launch container inner diameter;

the sonobuoy glide harness comprising:
  a stabilization parachute adapted to provide stabilization of the sonobuoy vehicle while the sonobuoy vehicle is in flight;
  a stabilization parachute ejection mechanism adapted to, while the sonobuoy vehicle is in flight, release the stabilization parachute from the sonobuoy vehicle;
  a plurality of deployable aerodynamic control surfaces;
  an actuation system operatively adapted to deploy the plurality of deployable aerodynamic control surfaces during and/or after launch of the sonobuoy vehicle from a flying aircraft;
  a guidance system operatively adapted to provide a dynamically determined, substantially controlled, and substantially guided descent of the sonobuoy vehicle from a release altitude, latitude, and longitude located within a predetermined release zone and toward a predetermined sonobuoy water entry zone that is defined by a predetermined range of water entry longitudes and a predetermined range of water entry latitudes; and/or
  an aerodynamic control surface ejection mechanism adapted to substantially simultaneously release the aerodynamic control surfaces from the sonobuoy vehicle, simultaneously deploying a terminal parachute;

wherein any of the following can be true:
  the sonobuoy launch container is adapted to substantially fit within a launch tube of the flying aircraft;
  the sonobuoy vehicle lacks an onboard source of thrust;
  the actuation system is operatively adapted to utilize an aerodynamic force on the sonobuoy vehicle to deploy at least one deployable aerodynamic control surface from the plurality of deployable aerodynamic control surfaces;
  the plurality of deployable aerodynamic control surfaces comprises a main wing that, upon deployment, is adapted to be moved from a stowed orientation that is substantially parallel to a direction of travel of the sonobuoy vehicle to a deployed orientation that is substantially perpendicular to the direction of travel of the sonobuoy vehicle;
  the plurality of deployable aerodynamic control surfaces comprises a main wing and one or more tail surfaces adapted to be removed at the end of the guided descent and prior to touchdown;
  the plurality of deployable aerodynamic control surfaces comprises one or more tail control surfaces that, upon deployment from a rear of the sonobuoy glide harness, are each adapted to be moved from a stowed orientation that is substantially parallel to a direction of travel of the sonobuoy vehicle to a respective deployed orientation that is substantially perpendicular to the direction of travel of the sonobuoy vehicle;
  the plurality of deployable aerodynamic control surfaces comprises a main wing and one or more tail control surfaces adapted to lock into a deployed state;
  the plurality of deployable aerodynamic control surfaces comprises one or more tail control surfaces that are attached to an actuator device and adapted to, after deploying out substantially perpendicular to a direction of travel of the sonobuoy vehicle, rotate into the direction of travel and be operatively controlled by the actuation device;
  the guidance system comprises an information device located in the sonobuoy glide harness;
  the guidance system is adapted to operatively adapt a flight path of the sonobuoy vehicle responsive to an altitude, velocity, azimuth, and/or flight path angle of the flying aircraft;
  the guidance system is adapted to produce a continuously updated plurality of longitudinal control commands and lateral control commands, each command adapted to correct an orientation of the sonobuoy vehicle for line-of-sight guidance to the predefined water entry zone while tracking an equilibrium glide condition;
  the guidance system is operatively adapted to utilize multi-phase longitudinal control to provide sink rate control, an optimal flight path angle for a given current bank angle and/or orientation of the sonobuoy vehicle, and/or an equilibrium glide condition;
  the guidance system is operatively adapted to provide roll angle instructions and/or lateral acceleration instructions to align a velocity heading and/or vector of the sonobuoy vehicle with the water entry zone;

the guidance system is operatively adapted to provide normal acceleration instructions to adjust a sink rate of the sonobuoy vehicle;

the guidance system is operatively adapted to utilize variations in a steepness of a descent path to land the sonobuoy internal module or sonobuoy vehicle in the predetermined sonobuoy water entry zone;

the guidance system is operatively adapted to automatically determine an altitude at which to cause the main wing and one or more tail control surfaces to be separated from the sonobuoy vehicle and the terminal parachute to be deployed;

the guidance system is operatively adapted to minimize an error between a point within the predetermined water entry zone and an actual landing point of the sonobuoy internal module;

the guidance system is operatively adapted to minimize a descent time to achieve touchdown of the sonobuoy internal module;

the guidance system is operatively adapted to maximize an operative range of the sonobuoy vehicle; and/or the guidance system is operatively adapted to adaptively respond to sonobuoy vehicle performance characteristics and/or environmental conditions that would otherwise prevent the sonobuoy internal module from landing in the predetermined water entry zone.

DEFINITIONS

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

acceleration—a time rate of change in the linear and/or angular speed and/or velocity, and/or the frequency, of an entity.

achieve—to attain with effort.

activity—an action, act, step, and/or process or portion thereof.

actual—real, realized, and/or existing; not merely potential or possible; based in reality; and/or measurable.

actuate—to physically move a device and/or system.

actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc.).

adapted to—suitable, fit, and/or capable of performing a specified function.

adapter—a device used to effect operative compatibility between different parts of one or more pieces of an apparatus or system.

adaptively—performing differently at different times.

adjust—to change so as to match, fit, adapt, conform, and/or be in a more effective state.

aerodynamic—designed to reduce and/or minimize the drag caused by air as an object moves though it and/or by wind that strikes and/or flows around an object.

after—following in time and/or subsequent to.

aircraft—a machine or device, such as an airplane, helicopter, glider, or dirigible, that is capable of atmospheric flight.

align—to adjust substantially into a proper orientation and location with respect to another thing.

altitude—an elevation and/or height of a thing above a reference level, especially above sea level and/or above the earth's surface.

and/or—either in conjunction with or in alternative to.

angle—an amount of rotation that separates two intersecting lines and/or rays.

apparatus—an appliance or device for a particular purpose associate—to join, connect together, and/or relate.

at least—not less than, and possibly more than.

attached—joined and/or secured together.

automatic—performed via an information device in a manner essentially independent of influence and/or control by a user. For example, an automatic light switch can turn on upon "seeing" a person in its "view", without the person manually operating the light switch.

automatically—acting and/or operating in a manner essentially independent of external human influence and/or control. For example, an automatic light switch can turn on upon "seeing" a person in its view, without the person manually operating the light switch.

azimuth—the horizontal angular distance from a reference direction, usually the northern point of the horizon, to the point where a vertical circle through a celestial body intersects the horizon, usually measured clockwise.

bank—the lateral inward tilting, as of a motor vehicle or an aircraft, in turning or negotiating a curve.

be—to exist in actuality.

between—in a separating interval and/or intermediate to.

Boolean logic—a complete system for logical operations.

by—via and/or with the use or help of.

can—is capable of, in at least some embodiments.

cause—to bring about, provoke, precipitate, produce, elicit, be the reason for, result in, and/or effect.

characteristic—a prominent attribute or aspect of something.

circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.

command—(n.) a signal that initiates an activity.

comprising—including but not limited to.

condition—a state at a particular time.

configure—to make suitable or fit for a specific use or situation.

connect—to join and/or fasten together.
connected—physically and/or logically linked.
containing—including but not limited to.
continuously—in a manner uninterrupted in time, sequence, substance, and/or extent.
control—(n) a mechanical or electronic device used to operate a machine within predetermined limits; (v) to exercise authoritative and/or dominating influence over, cause to act in a predetermined manner, direct, adjust to a requirement, and/or regulate.
convert—to transform, adapt, and/or change.
coupleable—capable of being joined, connected, and/or linked together.
coupling—linking in some fashion.
create—to bring into being.
cylindrical—of, relating to, and/or having the shape of a cylinder, especially of a circular cylinder.
data—distinct pieces of information, usually formatted in a special or predetermined way and/or organized to express concepts, and/or represented in a form suitable for processing by an information device.
data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.
define—to establish the meaning, relationship, outline, form, and/or structure of; and/or to precisely and/or distinctly describe and/or specify.
deploy—to put into use and/or action.
descend—to move from a higher to a lower place.
descent—the act or an instance of descending.
determine—to find out, obtain, calculate, decide, deduce, ascertain, and/or come to a decision, typically by investigation, reasoning, and/or calculation.
device—a machine, manufacture, and/or collection thereof
diameter—a length of a straight line segment passing through a center of an object and terminating at the periphery thereof
digital—non-analog and/or discrete.
direction—a spatial relation between something and a course along which it points and/or moves; a distance independent relationship between two points in space that specifies the position of either with respect to the other; and/or a relationship by which the alignment and/or orientation of any position with respect to any other position is established.
direction of travel—a distance-independent angular measure of transverse motion of an object relative to a point of reference.
during—at some time in a time interval.
dynamically—on demand, as necessary, and/or in an interactive manner wherein a current state is dependent on a past and/or future input and/or output.
each—every one of a group considered individually.
eject—to expel.
entry—the act and/or an instance of entering, ingress, and/or incursion.
environmental condition—an external circumstance and/or surrounding, such as wind, wind shear, jet stream, convection current, turbulence, storms, lightning, icing conditions, precipitation, humidity, barometric pressure, smoke, smog, dust, air pollution, and/or temperature inversion, etc.
equilibrium—a condition in which all acting influences are substantially canceled by others, resulting in a substantially stable, balanced, and/or unchanging system.
error—an unintended and/or unacceptable result of an action and/or procedure.
estimate—(n) a calculated value approximating an actual value; (v) to calculate and/or determine approximately and/or tentatively.
exceeding—greater than.
external—exterior and/or relating to, existing on, and/or connected with the outside and/or or an outer part.
fit—adapted to be of the right size and/or shape for; adapted to conform to a shape of
flight—the motion of an object in and/or through a medium, especially through the earth's atmosphere and/or through space.
flying—to engage in flight.
from—used to indicate a source, origin, and/or location thereof
generate—to create, produce, give rise to, and/or bring into existence.
given—specified and/or fixed.
glide harness—a device adapted to be operably mounted to a sonobuoy and/or adaptively guiding the sonobuoy toward a target landing zone.
guide—to direct, steer, and/or exert control and/or influence over.
haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.
having—including but not limited to.
housing—something that covers, encloses, protects, holds, and/or supports, such as a frame, box, and/or chassis.
human-machine interface—hardware and/or software adapted to render information to a user and/or receive information from the user; and/or a user interface.
including—including but not limited to.
information device—any device capable of processing data and/or information, such as any general purpose and/or special purpose computer, such as a personal computer, workstation, server, minicomputer, mainframe, supercomputer, computer terminal, laptop, tablet computer (such as an iPad-like device), wearable computer, Personal Digital Assistant (PDA), mobile terminal, Bluetooth device, communicator, "smart" phone (such as an iPhone-like device), messaging service (e.g., Blackberry) receiver, pager, facsimile, cellular telephone, traditional telephone, telephonic device, embedded controller, programmed microprocessor or microcontroller and/or peripheral integrated circuit elements, ASIC or other integrated circuit, hardware electronic logic circuit such as a discrete element circuit, and/or programmable logic device such as a PLD, PLA, FPGA, or PAL, or the like, etc. In general, any device on which resides a finite state machine capable of implementing at least a portion of a method, structure, and/or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc. In information device can be a component of and/or augment another device, such as an appliance, machine, tool, robot, vehicle, television, printer, "smart" utility meter, etc.

initialize—to prepare something for use and/or some future event.

inner—closer than another to the center and/or middle.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

install—to connect or set in position and prepare for use.

instructions—directions, which can be implemented as hardware, firmware, and/or software, the directions adapted to perform a particular operation and/or function via creation and/or maintenance of a predetermined physical circuit.

internal module—a sonobuoy.

into—to a condition, state, or form of.

lack—a particular deficiency or absence.

land—to set (a vehicle, animal, and/or object) down on land and/or another surface, such as water.

landing—the act or process of coming to land or rest, especially after a voyage and/or flight.

lateral—of or relating to the side or sides.

latitude—the angular distance north or south of the earth's equator, typically measured in degrees along a meridian, as on a map or globe.

launch—to set or thrust in motion.

length—a longest dimension of something and/or the measurement of the extent of something along its greatest dimension.

line-of-sight—a straight line along which an observer looks and/or a beam of radiation travels.

located—situated in a particular spot, region, and/or position.

lock—(n) a device and/or system adapted to fix in place, hold, entangle, and/or interlock securely. (v) to fix in place, hold, entangle, and/or interlock securely.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

longitude—the angular distance on the earth's surface, measured east or west from the prime meridian at Greenwich, England, to the meridian passing through a position, expressed in degrees (or hours), minutes, and seconds.

longitudinal—of and/or relating to a longitude.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain one or more machine-implementable instructions, data, and/or information. Examples include a memory device, punch card, player-piano scroll, etc.

main—primary.

maximize—to obtain a highest possible value of one or more variable quantities.

may—is allowed and/or permitted to, in at least some embodiments.

mechanism—a system, device, and/or portion thereof.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

minimize—to attempt to reduce in magnitude.

more—greater in size, amount, extent, and/or degree.

move—to change a position and/or place.

multi-phase—pertaining to distinct stages of a descent sequence.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, Ethernet card, cable modem, digital subscriber line interface, bridge, hub, router, or other similar device, software to manage such a device, and/or software to provide a function of such a device.

normal—substantially perpendicular to a defined line and/or plane.

not—a negation of something.

onboard—connected and/or integral.

one—being or amounting to a single unit, individual, and/or entire thing, item, and/or object.

operable—able to be normally operated.

operative—being in effect; operating.

operatively—in a manner able to function and/or to work.

optimal—optimum and/or most favorable and/or desirable.

orientation—a position and/or location relative to something else.

otherwise—under other circumstances.

outer—farther than another from the center and/or middle.

packet—a generic term for a bundle of data organized in a specific way for transmission, such as within and/or across a network, such as a digital packet-switching network, and comprising the data to be transmitted and certain control information, such as a destination address.

parachute—any of various similar unpowered devices that are used for retarding free-speeding or free-falling motion.

parallel—being an equal distance apart everywhere.

path—a route along which something moves.

perceptible—capable of being perceived by the human senses.

performance—operation, the act of performing, and/or the act of doing something successfully.

perpendicular—intersecting at or forming substantially right angles; and/or substantially at a right angle with respect to an axis.

physical—tangible, real, and/or actual.

physically—existing, happening, occurring, acting, and/or operating in a manner that is tangible, real, and/or actual.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of predefined—established, specified, and/or determined in advance.

predetermined—established in advance.

prevent—to impede, resist, hinder, stop, and/or keep from happening.

prior to—before.

probability—a quantitative representation of a likelihood of an occurrence.

processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

produce—to generate, create, and/or make via a physical effort.

project—to calculate, estimate, or predict.

provide—to furnish, supply, give, and/or make available.

range—a measure of an extent of a set of values and/or an amount and/or extent of variation.

rear—the point and/or area farthest from the front.

receive—to get as a signal, take, acquire, and/or obtain.

recommend—to suggest, praise, commend, and/or endorse.

release—to let go and/or free from something that restrains, binds, fastens, and/or holds back.

remove—to eliminate, remove, and/or delete, and/or to move from a place or position occupied.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

replace—to provide a substitute and/or equivalent in the place of.

request—to express a desire for and/or ask for.

respective—relating to two or more persons or things regarded individually.

respond—to reply.

responsive—reacting to an influence and/or impetus.

roll—to turn around and/or revolve on and/or as if on an axis.

rotate—to turn around an axis and/or center.

select—to make a choice or selection from alternatives.

separated—not touching and/or spaced apart by something.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

simultaneously—happening, existing, or done at substantially the same time.

sink—descent.

sonobuoy—a buoy equipped with an acoustic receiver and a radio transmitter that emits radio signals when it detects underwater sounds.

sonobuoy launch container—an enclosure operatively adapted for a launching a sonobuoy vehicle from an aircraft in flight.

sonobuoy vehicle—a sonobuoy operatively attached to a transport for the sonobuoy.

source—a point at which something originates, springs into being, and/or from which it derives and/or is obtained.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

stabilization—the maintenance of a desired condition or state of a thing for which a condition or state may be subject to change.

state—a qualitative and/or quantitative description of condition.

steepness—a measure of inclination.

store—to place, hold, and/or retain data, typically in a memory.

stow—to place and/or arrange, especially in a neat, compact way.

substantially—to a great extent and/or degree.

support—to bear the weight of, especially from below.

surface—the outer boundary of an object and/or a material layer constituting and/or resembling such a boundary.

surround—to encircle, enclose, and/or confine on several and/or all sides.

switch—(v) to: form, open, and/or close one or more circuits; form, complete, and/or break an electrical and/or informational path; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

system—a collection of mechanisms, devices, machines, articles of manufacture, processes, data, and/or instructions, the collection designed to perform one or more specific functions.

tail—an appendage to the rear or bottom of a thing.

target—a destination.

terminal—of, at, relating to, or forming a limit, boundary, extremity, or end.

that—a pronoun used to indicate a thing as indicated, mentioned before, present, and/or well known.

thrust—to push and/or drive quickly and/or forcibly.

time—a measurement of a point in a nonspatial continuum in which events occur in apparently irreversible succession from the past through the present to the future.

touchdown—the act of coming down to the earth (and/or other surface, such as a body of water).

toward—used to indicate a destination and/or in a physical and/or logical direction of track—to observe, monitor, follow the course of, and/or maintain.

transform—to change in measurable: form, appearance, nature, and/or character.

transmit—to send as a signal, provide, furnish, and/or supply.

tube—an elongate member having a longitudinal axis and defining a longitudinal cross-section resembling any closed shape such as, for example, a circle, a non-circle such as an oval (which generally can include a shape that is substantially in the form of an obround, ellipse, limacon, cardioid, cartesian oval, and/or Cassini oval, etc.), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube.

update—to change and/or make current.

upon—on occasion of, during, when, and/or while.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

variation—the act, process, or result of varying and/or changing.

vector—an expression characterized by a magnitude and a direction.

velocity—a translational speed.

via—by way of and/or utilizing.

water—a substance expressed chemically as $H_2O$ and/or potentially comprising one or more other substances, such as floating objects, miscible and/or non-miscible liquids, dissolved solids, and/or dissolved gases, etc.

wherein—in regard to which; and; and/or in addition to.

which—a pronoun adapted to be used in clauses to represent a specified antecedent.

while—for as long as, during the time that, and/or at the same time that.

wing—an airfoil whose principal function is providing lift and/or something that resembles a wing in appearance, function, and/or position relative to a main body.

with—accompanied by, in support of, and/or in the same direction as.

within—inside the limits of.

zone—an area and/or region.

Note

Various substantially and specifically practical and useful exemplary embodiments are described herein, textually and/or graphically, including the best mode, if any, known to the inventor(s), for implementing the described subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the described subject matter to be practiced other than as specifically described herein. Accordingly, as permitted by law, the described subject matter includes and covers all variations, details, and equivalents of that described subject matter. Moreover, as permitted by law, every combination of the herein described characteristics, functions, activities, substances, and/or structural elements, and all possible variations, details, and equivalents thereof, is encompassed by the described subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any described subject matter unless otherwise stated. No language herein should be construed as indicating any described subject matter as essential to the practice of the described subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of any claims presented herein or in any document claiming priority hereto) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into and clearly implied as being presented within the specification as if it were individually recited herein. For example, if a range of 1 to 10 is described, even implicitly, unless otherwise stated, that range necessarily includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) described herein or appearing in a claim is followed by a drawing element number, that drawing element number is exemplary and non-limiting on the description and claim scope.

No claim of this document or any document claiming priority hereto is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto (including any patent application claiming priority hereto) any reference to any claimed subject matter is intended to reference the precise language of the then-pending claimed subject matter at that particular point in time only.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A tube-launched device comprising:
   a sonobuoy glide harness configured to:
      be operably connected to a sonobuoy internal module to form a sonobuoy vehicle, the sonobuoy vehicle defining a sonobuoy vehicle length and a sonobuoy vehicle outer diameter; and
      operatively substantially surround the sonobuoy internal module, the sonobuoy internal module defining a sonobuoy internal module length, the sonobuoy glide harness defining a sonobuoy glide harness length and a sonobuoy glide harness outer diameter, the sonobuoy glide harness length not exceeding the sonobuoy internal module length;
   the sonobuoy glide harness comprising a plurality of deployable aerodynamic control surfaces; and
   the plurality of deployable aerodynamic control surfaces comprising one or more folding tail control surfaces.

2. The device of claim 1, further comprising:
   a stabilization parachute configured to provide stabilization of the sonobuoy vehicle while the sonobuoy vehicle is in flight.

3. The device of claim 1, further comprising:
   a stabilization parachute ejection mechanism configured to, while the sonobuoy vehicle is in flight, release a stabilization parachute from the sonobuoy vehicle.

4. The device of claim 1, further comprising:
   an actuation system operatively configured to deploy the plurality of deployable aerodynamic control surfaces during and/or after launch of the sonobuoy vehicle from a flying aircraft.

5. The device of claim 1, further comprising:
   a guidance system operatively configured to provide a substantially guided descent of the sonobuoy vehicle.

6. The device of claim 1, further comprising:
   a guidance system operatively configured to provide a substantially guided descent of the sonobuoy vehicle from a predetermined release zone and toward a predetermined sonobuoy water entry zone.

7. The device of claim 1, further comprising:
   a guidance system operatively configured to provide a dynamically determined, substantially controlled, and substantially guided descent of the sonobuoy vehicle from a release altitude, latitude, and longitude located within a predetermined release zone and toward a predetermined sonobuoy water entry zone that is defined by a predetermined range of water entry longitudes and a predetermined range of water entry latitudes.

8. The device of claim 1, further comprising:
   an aerodynamic control surface ejection mechanism configured to substantially simultaneously release the plurality of deployable aerodynamic control surfaces from the sonobuoy vehicle and deploy a terminal parachute.

9. The device of claim 1, wherein:
   the sonobuoy vehicle is configured to launch from a sonobuoy launch container that defines a sonobuoy launch container inner diameter; and
   the sonobuoy vehicle outer diameter does not exceed the sonobuoy launch container inner diameter.

10. The device of claim 1, wherein:
    the sonobuoy launch container is configured to substantially fit within a launch tube of the flying aircraft.

11. The device of claim 1, wherein:
    the sonobuoy vehicle lacks an onboard source of thrust.

12. The device of claim 1, further comprising:
    an actuation system that is operatively configured to utilize an aerodynamic force on the sonobuoy vehicle to deploy at least one deployable aerodynamic control surface from the plurality of deployable aerodynamic control surfaces.

13. The device of claim 1, wherein:
    the plurality of deployable aerodynamic control surfaces comprises a main wing that, upon deployment, is configured to be moved from a stowed orientation that is substantially parallel to a direction of travel of the sonobuoy vehicle to a deployed orientation that is substantially perpendicular to the direction of travel of the sonobuoy vehicle.

14. The device of claim 1, wherein:
the plurality of deployable aerodynamic control surfaces comprises a main wing, the main wing and the one or more folding tail control surfaces configured to be removed at the end of the guided descent and prior to touchdown.

15. The device of claim 1, wherein:
the one or more folding, tail control surfaces, upon deployment from a rear of the sonobuoy glide harness, are each configured to be moved from a stowed orientation that is substantially parallel to a direction of travel of the sonobuoy vehicle to a respective deployed orientation that is substantially perpendicular to the direction of travel of the sonobuoy vehicle.

16. The device of claim 1, wherein:
the plurality of deployable aerodynamic control surfaces comprises a main wing, the main wing and the one or more folding tail control surfaces configured to lock into a deployed state.

17. The device of claim 1, wherein:
the one or more folding tail control surfaces are attached to an actuator device and configured to, after deploying out substantially perpendicular to a direction of travel of the sonobuoy vehicle, rotate into the direction of travel and be operatively controlled by an actuation device.

18. The device of claim 1, further comprising:
a guidance system comprising an information device located in the sonobuoy glide harness.

19. The device of claim 1, further comprising:
a guidance system configured to operatively adapt a flight path of the sonobuoy vehicle responsive to an altitude, velocity, azimuth, and/or flight path angle of a flying aircraft from which the sonobuoy vehicle is configured to be launched.

20. The device of claim 1, further comprising:
a guidance system configured to produce a continuously updated plurality of longitudinal control commands and lateral control commands, each command configured to correct an orientation of the sonobuoy vehicle for line-of-sight guidance to a predefined water entry zone while tracking an equilibrium glide condition.

21. The device of claim 1, further comprising:
a guidance system operatively configured to utilize multi-phase longitudinal control to provide sink rate control, an optimal flight path angle for a given current bank angle of the sonobuoy vehicle, and/or an equilibrium glide condition.

22. The device of claim 1, further comprising:
a guidance system operatively configured to provide roll angle instructions to align a velocity vector of the sonobuoy vehicle with a predetermined sonobuoy water entry zone.

23. The device of claim 1, further comprising:
a guidance system operatively configured to provide normal acceleration instructions to adjust a sink rate of the sonobuoy vehicle.

24. The device of claim 1, further comprising:
a guidance system operatively configured to utilize variations in a steepness of a descent path to land the sonobuoy internal module or sonobuoy vehicle in a predetermined sonobuoy water entry zone.

25. The device of claim 1, further comprising:
a guidance system operatively configured to automatically determine an altitude at which to cause a main wing and one or more tail control surfaces to be separated from the sonobuoy vehicle and a terminal parachute to be deployed.

26. The device of claim 1, further comprising:
a guidance system operatively configured to minimize an error between a point within the predetermined sonobuoy water entry zone and an actual landing point of the sonobuoy internal module.

27. The device of claim 1, further comprising:
a guidance system operatively configured to minimize a descent time to achieve touchdown of the sonobuoy internal module.

28. The device of claim 1, further comprising:
a guidance system operatively configured to maximize an operative range of the sonobuoy vehicle.

29. The device of claim 1, further comprising:
a guidance system operatively configured to adaptively respond to sonobuoy vehicle performance characteristics and/or environmental conditions that would otherwise prevent the sonobuoy internal module from landing in the predetermined sonobuoy water entry zone.

30. A method comprising:
providing a dynamically determined, substantially controlled, and substantially guided descent of a tube-launched sonobuoy vehicle from a predetermined release zone and toward a predetermined sonobuoy water entry zone, the sonobuoy vehicle comprising a sonobuoy glide harness configured to:
be operably connected to a sonobuoy internal module to form the sonobuoy vehicle, the sonobuoy vehicle defining a sonobuoy vehicle length and a sonobuoy vehicle outer diameter; and
operatively substantially surround the sonobuoy internal module, the sonobuoy glide harness defining a sonobuoy glide harness length and a sonobuoy glide harness outer diameter, the sonobuoy glide harness length not exceeding the sonobuoy internal module length;
wherein the sonobuoy glide harness comprises:
a plurality of deployable aerodynamic control surfaces, the plurality of deployable aerodynamic control surfaces comprising one or more folding tail control surfaces.

31. A machine-readable medium storing machine-implementable instructions for activities comprising:
providing a dynamically determined, substantially controlled, and substantially guided descent of a tube-launched sonobuoy vehicle from a predetermined release zone and toward a predetermined sonobuoy water entry zone, the sonobuoy vehicle comprising a sonobuoy glide harness configured to:
be operably connected to a sonobuoy internal module to form the sonobuoy vehicle, the sonobuoy vehicle defining a sonobuoy vehicle length and a sonobuoy vehicle outer diameter; and
operatively substantially surround the sonobuoy internal module, the sonobuoy internal module defining a sonobuoy internal module length, the sonobuoy glide harness defining a sonobuoy glide harness length and a sonobuoy glide harness outer diameter, the sonobuoy glide harness length not exceeding the sonobuoy internal module length;
wherein the sonobuoy glide harness comprises:
a plurality of deployable aerodynamic control surfaces, the plurality of deployable aerodynamic control surfaces comprising one or more folding tail control surfaces.

32. A circuit comprising:
- a guidance sub-circuit configured to provide a dynamically determined, substantially controlled, and substantially guided descent of a sonobuoy vehicle from a predetermined release zone and toward a predetermined sonobuoy water entry zone, the sonobuoy vehicle comprising a sonobuoy glide harness configured to:
  - be operably connected to a sonobuoy internal module to form the sonobuoy vehicle, the sonobuoy vehicle defining a sonobuoy vehicle length and a sonobuoy vehicle outer diameter; and
  - operatively substantially surround the sonobuoy internal module, the sonobuoy internal module defining a sonobuoy internal module length, the sonobuoy glide harness defining a sonobuoy glide harness length and a sonobuoy glide harness outer diameter, the sonobuoy glide harness length not exceeding the sonobuoy internal module length;
- wherein the sonobuoy glide harness comprises:
  - a plurality of deployable aerodynamic control surfaces, the plurality of deployable aerodynamic control surfaces comprising one or more folding tail control surfaces.

* * * * *